(No Model.)
G. M. MILLS.
CANDY WHISTLE AND MOLD FOR MANUFACTURING THE SAME.
No. 267,562. Patented Nov. 14, 1882.
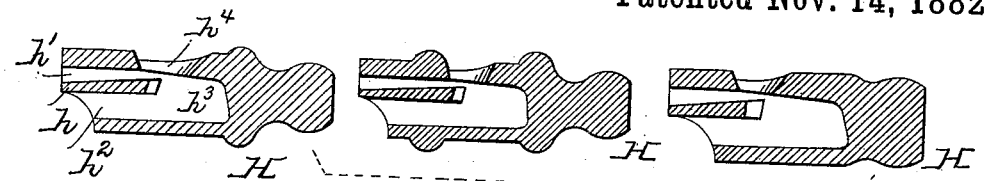
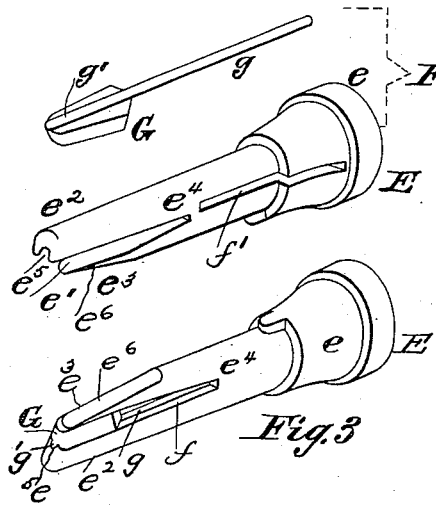
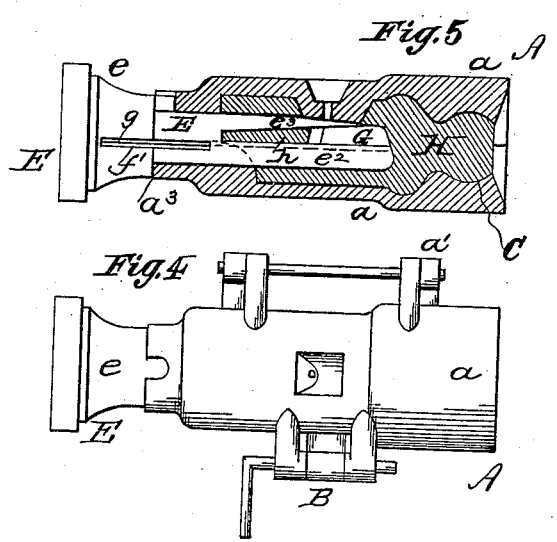
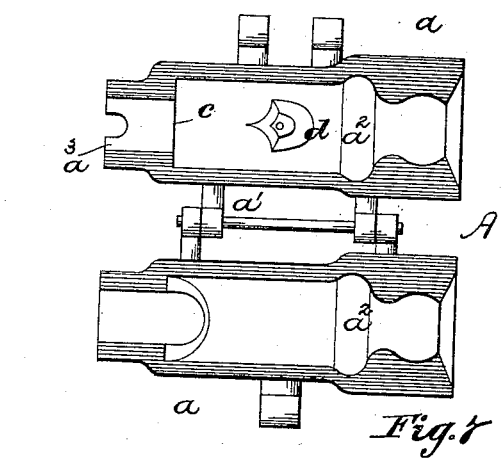
WITNESSES:
S. J. VanStavoren
Jos. B. Connolly
INVENTOR,
Geo. M. Mills,
By Connolly Bros,
ATTORNEYS
N. PETERS. Photo-Lithographer, Washington. D. C.

UNITED STATES PATENT OFFICE.

GEORGE M. MILLS, OF PHILADELPHIA, PENNSYLVANIA.

CANDY WHISTLE AND MOLD FOR MANUFACTURING THE SAME.

SPECIFICATION forming part of Letters Patent No. 267,562, dated November 14, 1882.

Application filed October 21, 1881. Renewed May 3, 1882. (No model.)

*To all whom it may concern:*

Be it known that I, GEORGE M. MILLS, a citizen of the United States, residing at Philadelphia, in the county of Philadelphia and State of Pennsylvania, have invented certain new and useful Improvements in Candy Whistles and in Molds for Manufacturing the Same; and I do hereby declare the following to be a full, clear, and exact description of the invention, reference being had to the accompanying drawings, which form part of this specification, in which—

Figure 1 shows vertical sections of various designs of whistles. Fig. 2 shows perspectives of core and plug. Fig. 3 represents a perspective of core with plug in its proper position. Fig. 4 is a plan of mold. Fig. 5 is a vertical longitudinal section of the same. Fig. 6 is a similar view with core withdrawn, and Fig. 7 is a plan of the mold when opened.

My invention has relation to whistles made of candy or other frangible material, and has for its object to produce a more durable whistle than any heretofore made, and which shall be less liable to fracture or injury in the process of manufacture than previously-made whistles have been.

In Letters Patent of the United States granted to me, dated June 22, 1880, No. 229,163, is shown a mold for candy whistles and a whistle produced in such mold. In such patented mold are employed two converging cores, by means of which a whistle is formed with two air-passages separated by a diaphragm, which at its inner extremity terminates in a point or edge. I have found that in the act of withdrawing the cores from said mold the inner thin end or point of the diaphragm is liable to become broken, thereby destroying the efficiency of the whistle. To obviate this difficulty I provide a mold having a single bifurcated core with removable plug, whereby I am enabled to produce a whistle having two communicating air-passages separated by a diaphragm, which is of such depth or body at its inner end as not to be liable to be fractured by the withdrawal of the core or its plug.

Referring to the accompanying drawings, A indicates a mold made in two parts, $a\ a$, which, for convenience of construction and operation, are hinged together at $a'$ and provided with a bolt or lock, B. The sections are made with recesses $a^2\ a^2$, which, when the said sections are closed together, form a chamber, C, corresponding to the external form or configuration of the whistle to be produced in the mold, said chamber opening outwardly at either end. One of the sections is formed with an inwardly-projecting boss, $d$, which forms the air-vent in the whistle.

E represents the core, which projects into the chamber C, as shown, its enlarged end $e$ remaining without and forming a handle for its insertion and withdrawal. The inner end of said core is bifurcated, as shown at $e'$, forming forks or tines $e^2\ e^3$, the bifurcation extending to the point $e^4$, which, when said core is inserted in the mold, is coincident with the end $c$ of the chamber C.

G represents a plug, which is inserted in the kerf or bifurcation $e$, filling up the latter for about one-half its extent, thus, in effect, making the inner end of the core solid, and leaving a slot, (designated as $f$ in Fig. 3,) which extends from side to side of the core. Said plug is made with a slender extension, $g$, which is a prolongation of a bead, $g'$, on the top of the body of the plug, and forms a stem for the latter. Said bead and stem rest in a groove, $e^5$, in the tine $e^2$, the stem entering a lateral recess, $f'$, in the body of the core E. The core is inserted in the mold, entering through the open end $a^3$. The candy is poured through the opposite end and fills the chamber C around said core, as well as the slot $f$ in the latter. On withdrawing the core, which is effected by a straight pull backward, the plug G leaves said core E and remains in the mold, being prevented from coming out by the candy which flowed into the slot $f$, and which forms the diaphragm or dividing-wall $h$ between the air-passages $h'\ h^2$ of the whistle H. The mold is now opened and the whistle lifted out, carrying the plug with it. To withdraw the plug from the whistle said plug is dropped down into the lower part of the chamber $h^3$, as represented by dotted lines $x$, Fig. 6, and drawn out through the air-passage $h^2$ by means of its stem $g$.

The whistle thus formed has, it will be noted, two longitudinal air-passages, which communicate with the internal air-chamber. Said passages do not, however, converge or incline toward each other, as do the passages shown in my aforesaid patent. The separating-diaphragm between said passages is of substantially even thickness throughout, being a shade thicker at its inner end than elsewhere, thus forming a stable division which does not break down on withdrawing the core, but remains intact, producing a strong and durable whistle with excellent acoustic properties.

The recess $f'$ is to afford facility for cleaning in case the stem $g$, in being inserted in the core, should push any candy down before it, which might prevent the plug G from entering the bifurcated end of the core to the necessary extent.

It will be observed that the upper and lower sides of the slot $f$ slope toward each other, thus giving an upward slope to the top surface of the diaphragm $h$, thereby causing the air blown through the passage $h'$ to strike the rear edge of the vent $h^4$, so as to produce the proper whistling sound. The upper side of the end of the core is beveled at $e^6$, as shown, and the adjacent side of the boss $d$ inclined, thereby causing the rear edge of the vent in the whistle to be a trifle lower than its front edge, so as to insure the striking of the air blown through the passage $h'$ against said edge.

What I claim as my invention is as follows:

1. A mold for candy whistles, having a core with a detachable plug at its inner end, substantially as shown and described.

2. A candy-whistle-mold core having its inner end bifurcated or kerfed, and provided with a plug which only partly fills the bifurcation, leaving a slot for the passage of the candy in molding, substantially as shown and set forth.

3. The combination, with the candy-whistle-mold core having its inner end bifurcated and one of its tines grooved, of a detachable sliding plug, G, having a stem, $g$, substantially as shown and described.

4. A candy whistle having two longitudinal air-passages communicating with an internal air-chamber, said passages being divided by a diaphragm, $h$, of substantially even thickness throughout, as shown, and for the purpose specified.

5. A candy-whistle mold having a vent boss inclined on its lower or inner side, in combination with a core having its adjacent side correspondingly beveled, whereby the rear edge of the vent of the whistle formed in such mold is lower than its front edge.

In testimony that I claim the foregoing I have hereunto set my hand this 12th day of October, 1881.

GEORGE M. MILLS.

Witnesses:
   JOHN W. STEWARD,
   S. J. VAN STAVOREN.